United States Patent
Wang et al.

(10) Patent No.: US 11,962,949 B2
(45) Date of Patent: Apr. 16, 2024

(54) METHOD OF AIR POLLUTION ESTIMATION BASED ON SPECTRAL IMAGE PROCESSING

(71) Applicant: NATIONAL CHUNG CHENG UNIVERSITY, Chiayi County (TW)

(72) Inventors: Hsiang-Chen Wang, Chiayi County (TW); Chia-Cheng Huang, Chiayi County (TW); Ting-Chun Men, Chiayi County (TW)

(73) Assignee: National Chung Cheng University, Chiayi County (TW)

( * ) Notice: Subject to any disclaimer, the term of this patent is extended or adjusted under 35 U.S.C. 154(b) by 412 days.

(21) Appl. No.: 17/382,988

(22) Filed: Jul. 22, 2021

(65) Prior Publication Data

US 2022/0303516 A1    Sep. 22, 2022

(30) Foreign Application Priority Data

Mar. 18, 2021   (TW) ................. 110109760

(51) Int. Cl.
| | | |
|---|---|---|
| *G06T 7/90* | (2017.01) | |
| *G06T 7/00* | (2017.01) | |
| *H04N 9/67* | (2023.01) | |

(52) U.S. Cl.
CPC .......... *H04N 9/67* (2013.01); *G06T 7/0002* (2013.01); *G06T 7/90* (2017.01); *G06T 2207/10024* (2013.01); *G06T 2207/20081* (2013.01); *G06T 2207/20084* (2013.01)

(58) Field of Classification Search
CPC .......... H04N 9/67; G06T 7/0002; G06T 7/90; G06T 2207/10024; G06T 2207/20081; G06T 2207/20084; G06T 2207/20048; G06T 2207/30192; G06T 2207/30232

USPC ......................................................... 382/167
See application file for complete search history.

(56) References Cited

U.S. PATENT DOCUMENTS

| | | | | |
|---|---|---|---|---|
| 11,100,357 B2 * | 8/2021 | Wang | ................... | G06V 10/993 |
| 2019/0201082 A1 * | 7/2019 | Shelton, IV | ............ | A61M 1/74 |
| 2019/0201083 A1 * | 7/2019 | Shelton, IV | ...... | A61B 17/07207 |
| 2019/0201086 A1 * | 7/2019 | Shelton, IV | ....... | A61B 18/1477 |
| 2019/0201594 A1 * | 7/2019 | Shelton, IV | ...... | A61B 1/000096 |

FOREIGN PATENT DOCUMENTS

| | | |
|---|---|---|
| CN | 105445204 A | 3/2016 |
| CN | 108052980 A | 5/2018 |

OTHER PUBLICATIONS

Taiwanese Search Report appended to an Office Action, which was issued to Taiwanese counterpart application No. 110109760 by the TIPO on Mar. 31, 2022, with an English translation thereof (2 pages).

* cited by examiner

*Primary Examiner* — Ali Bayat
(74) *Attorney, Agent, or Firm* — Michael Best & Friedrich LLP (57) ABSTRACT

A method of performing air pollution estimation is provided. The method is to be implemented using a processor of a computer device and includes: generating a spectral image based on an original color image of an environment under test using a spectral transformation matrix; supplying the spectral image as an input into an estimating model for air pollution estimation; and obtaining an estimation result from the estimating model indicating a degree of air pollution of the environment under test.

17 Claims, 6 Drawing Sheets

METHOD OF AIR POLLUTION ESTIMATION BASED ON SPECTRAL IMAGE PROCESSING

CROSS-REFERENCE TO RELATED APPLICATION

This application claims priority of Taiwanese Patent Application No. 110109760, filed on Mar. 18, 2021.

FIELD

The disclosure relates to a method of air pollution estimation based on spectral image processing.

BACKGROUND

Air pollution has become an important issue in modern day lives, with the advancement of technology, the manufacturing industry, and associated emissions of particles. Typically, a number of aerosol particles (e.g., solid particles, gas particles, liquid particles, etc.) suspended in the air may cause air pollution. These particles are mostly small in size and cannot be directly perceived by the human eye; however, the potential harmful effect on human beings exposed to these particles is immense. According to statistical data from the World Health Organization (WHO), about 7 million people die each year from diseases (such as respiratory tract infection, chronic obstructive pulmonary disease (COPD), heart diseases, etc.) caused by air pollution. As a result, detection of the severity of air pollution becomes desirable.

Conventionally, detection of the severity of air pollution may be done by using instruments (e.g., a tapered element oscillating microbalance (TEOM), a high volume air sampler, a low volume air sampler, etc.) to collect samples of aerosol particles suspended in the air. In one example, air is continuously pumped into an inlet of the instrument for one day. The instrument is configured to filter out the larger particles such that the particles with a diameter equal to or smaller than 2.5 μm (also known as fine particles or $PM_{2.5}$) are collected onto a filter (e.g., a filter paper). By measuring a weight of the filter before the operations and a weight of the filter after the day of operations, a difference therebetween may be calculated and serve as a net weight of the fine particles collected throughout the day. By dividing the net weight by the volume of the air pumped into the instrument throughout the day, an average concentration of fine particles during the day can be obtained.

It is noted that the filter paper needs to be carefully pre-processed and weighed so as to determine a precise weight thereof. Also, the instrument, especially the inlet, needs to be carefully calibrated to prevent articles other than the fine articles from ending up on the filter paper.

An article by Z. He, X. Ye, K. Gu & J. Qiao, "Learn to predict PM2.5 concentration with image contrast-sensitive features", in 2018 37*th Chinese Control Conference (CCC)*, 2018: IEEE, pp. 4102-4106 discloses a model for estimating the concentration of the fine particles using image contrast-sensitive features. In this document, a recurrent fuzzy neural network model is established to extract features from colored images captured by, for example, a camera, so as to estimate the concentration of the fine particles. Parameters of the recurrent fuzzy neural network model may be trained using a gradient descent algorithm with self-adaptive learning rate.

SUMMARY

One object of the disclosure is to provide a method that is capable of implementing a relatively more accurate estimation of a severity of air pollution.

According to the disclosure, the method includes is implemented using a processor of a computer device and includes:
A) generating a spectral image based on an original color image of an environment under test using a spectral transformation matrix;
B) supplying the spectral image as an input into an estimating model for air pollution estimation; and
C) from the estimating model, obtaining an estimation result indicating a degree of air pollution of the environment under test.

Another object of the disclosure is to provide a method for obtaining a spectral transformation matrix to be used in performing the above-mentioned air pollution estimation.

According to the disclosure, the method is implemented using a processor of a computer device. The computer device stores a reference color image of a reference object and a reflection spectral dataset associated with the reference object. The method includes:
performing a converting operation to convert the reference color image and the reflection spectral dataset to a CIE 1931 XYZ color space created by the International Commission on Illumination (CIE) in 1931, so as to obtain a converted reference image and a converted spectral dataset corresponding to the reference color image and the reflection spectral dataset, respectively;
obtaining a parameter matrix from the converted reference image;
obtaining an adjustment matrix from the converted spectral dataset and the parameter matrix;
obtaining a corrected image based on the parameter matrix and the adjustment matrix; and
obtaining the spectral transformation matrix from the reflection spectral dataset and the corrected image.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "coupled to" may refer to a direct connection among a plurality of electrical apparatus/devices/equipments via an electrically conductive material (e.g., an electrical wire), or an indirect connection between two electrical apparatus/devices/equipments via another one or more apparatus/devices/equipments, or wireless communication.

Figure 1:
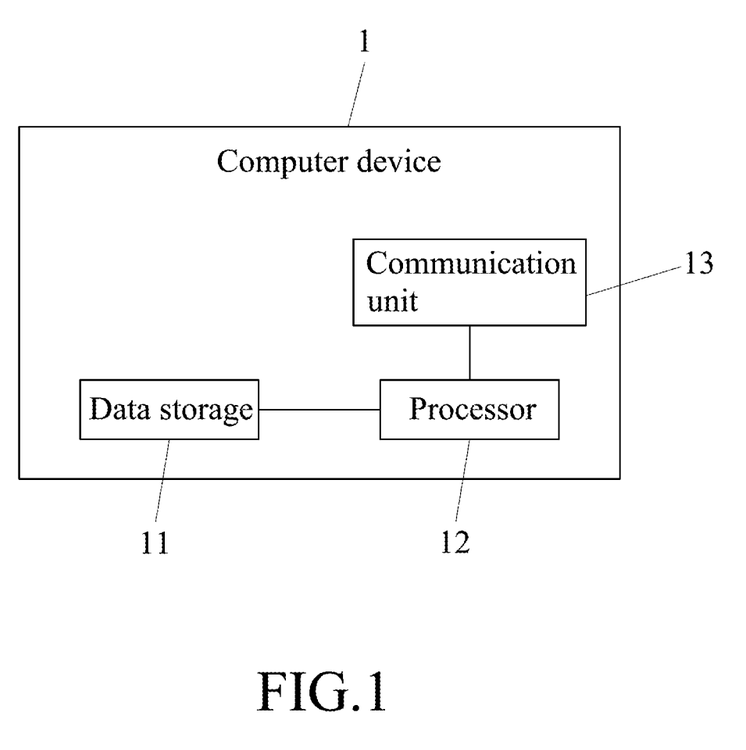
FIG. 1 is a block diagram illustrating a computer device according to one embodiment of the disclosure.

FIG. 1 is a block diagram illustrating a computer device 1 according to one embodiment of the disclosure. In this embodiment, the computer device 1 may be embodied using a server device, a personal computer, a laptop, a tablet, a mobile device, etc. The computer device 1 includes a data storage 11, a processor 12 connected to the data storage 11, and a communication unit 13.

The processor 12 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

The communication unit 13 is connected to the processor 12, and may include at least one of a radio-frequency integrated circuit (RFIC), a short-range wireless communication module supporting a short-range wireless communication network using a wireless technology of Bluetooth® and/or Wi-Fi, etc., or a mobile communication module supporting telecommunication using Long-Term Evolution (LTE), the third generation (3G) and/or fifth generation (5G) of wireless mobile telecommunications technology, and/or the like.

The data storage 11 is connected to the processor 12, and may be embodied using computer-readable storage medium such as hard disk drive(s), random access memory (RAM), read only memory (ROM), programmable ROM (PROM), firmware, flash memory, etc.

In this embodiment, the data storage 11 stores a software application program, a plurality of training color images of a specific environment, a plurality of severity tags associated respectively with the training color images and each indicating a degree of air pollution, a reference color image of a reference object, and a reflection spectral dataset associated with the reference object. The software application program includes instructions that, when executed by the processor 12, cause the processor 12 to perform a number of operations as described in the subsequent paragraphs.

The training color images may be captured using a camera, and may each be in the form of an 8-bit color image. The camera may be mounted on a drone for capturing images of nearby environment. Specifically, each of the training color images is an aerial view. The reference object may be X-Rite ColorChecker® Classic, which includes twenty-four color squares with twenty-four common natural colors, respectively. The reference color image may be captured using a camera, and may be in the form of an 8-bit color image expressed using a standard red, green, blue (sRGB) color space. In some embodiments, the reference color image and the training color images are captured using the same camera. The reflection spectral dataset may include spectral data (spectrum) of light reflected by the reference object, measured by, for example, a spectrometer, and correspond to wavelengths ranging from 380 to 780 nm and have a spectral resolution of 1 nm. In the reflection spectral dataset, the wavelengths correspond to a plurality of spectral values (i.e., intensity values), respectively. The severity tags may include, for example, three types of tags of "Good", "Moderate" and "Severe", each of which corresponds to a specific range of concentration of aerosol particles with a diameter equal to or smaller than 2.5 μm (also known as fine particles or $PM_{2.5}$). Each of the three types of tags may be also associated with a specific color (e.g., green for "Good", yellow for "Moderate" and red for "Severe"). It is noted that in some embodiments, the severity tags may include more than three types of tags.

In use, it is desired to estimate a severity of air pollution of an environment under test using a color image of the environment under test captured using a camera. In some embodiments of the disclosure, a method of air pollution estimation based on spectral image processing may include a matrix calculating process, a model constructing process, and an air pollution estimating process.

Figure 2:
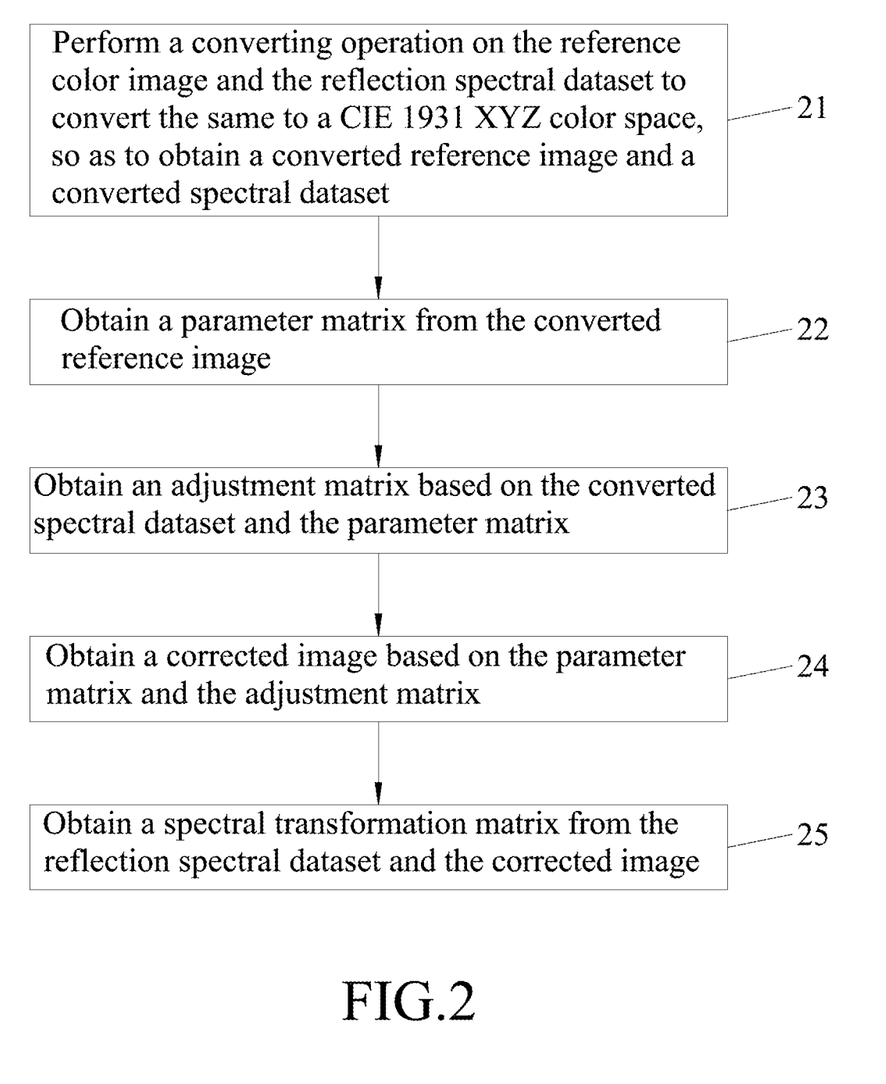
FIG. 2 is a flow chart illustrating steps of a matrix calculating process according to one embodiment of the disclosure.

FIG. 2 is a flow chart illustrating steps of the matrix calculating process according to one embodiment of the disclosure. The matrix calculating process may be implemented by the processor 12 executing the software application program.

In step 21, the processor 12 performs a converting operation on the reference color image and the reflection spectral dataset to convert the same to a CIE 1931 XYZ color space created by the International Commission on Illumination (CIE) in 1931, so as to obtain a converted reference image and a converted spectral dataset corresponding to the reference color image and the reflection spectral dataset, respectively.

Specifically, the converting operation includes, with respect to the reference color image, obtaining the converted reference image using the following equations:

$$\begin{bmatrix} X_C \\ Y_C \\ Z_C \end{bmatrix} = [M_A][T] \begin{bmatrix} f(R_{sRGB}) \\ f(G_{sRGB}) \\ f(B_{sRGB}) \end{bmatrix} \times 100, \quad 0 \le \begin{matrix} R_{sRGB} \\ G_{sRGB} \\ B_{sRGB} \end{matrix} \le 1;$$

$$T = \begin{bmatrix} 0.4104 & 0.3576 & 0.1805 \\ 0.2126 & 0.7152 & 0.0722 \\ 0.0193 & 0.1192 & 0.9505 \end{bmatrix};$$

$$f(n) = \begin{cases} \left(\dfrac{n+0.055}{1.055}\right)^{2.4}, & n > 0.04045 \\ \left(\dfrac{n}{12.92}\right), & \text{otherwise} \end{cases};$$

and $$[M_A] = \begin{bmatrix} X_{SW}/X_{CW} & 0 & 0 \\ 0 & Y_{SW}/Y_{CW} & 0 \\ 0 & 0 & Z_{SW}/Z_{CW} \end{bmatrix},$$

where $X_C$, $Y_C$ end $Z_C$ represent an X value, a Y value and a Z value of a pixel of the converted reference image in the CIE 1931 XYZ color space, $R_{sRGB}$, $G_{sRGB}$ and $B_{sRGB}$ represent a red value, a green value and a blue value of a pixel of the reference color image in the sRGB color space corresponding to the pixel of the converted reference image, $X_{CW}$, $Y_{CW}$ and $Z_{CW}$ represent a red value, a green value and a blue value of a white point defining the white color in the sRGB color space that is captured under the CIE standard illuminant D65), $X_{SW}$, $Y_{SW}$ and $Z_{SW}$ represent a white point for an environmental illuminant under which the reference color image was captured, and $[M_A]$ represents a chromatic adaptation matrix. The white point is a set of tristimulus values or a set of chromaticity coordinates.

It is noted that, since the environmental illuminant used for capturing the reference color image may be one other than the standard illuminant in the sRGB color space, the chromatic adaptation matrix [$M_A$] is employed for converting the white point for the standard illuminant to a corresponding white point for the environmental illuminant of the reference color image.

The converting operation also includes, with respect to the reflection spectral dataset, obtaining the converted spectral dataset using the following equations:

$$X_S = k \int_{380nm}^{780nm} S(\lambda) R(\lambda) \bar{x}(\lambda) d\lambda;$$

$$Y_S = k \int_{380nm}^{780nm} S(\lambda) R(\lambda) \bar{y}(\lambda) d\lambda;$$

$$Z_S = k \int_{380nm}^{780nm} S(\lambda) R(\lambda) \bar{z}(\lambda) d\lambda; \text{ and}$$

$$k = 100 / \int_{380nm}^{780nm} S(\lambda) \bar{y}(\lambda) d\lambda,$$

where, for each wavelength $\lambda$ of the spectrum of the reflection spectral dataset (having a range between 380 to 780 nanometers), $X_S$, $Y_S$ and $Z_S$ represent an X value, a Y value and a Z value of the converted spectral dataset in the CIE 1931 XYZ color space for the spectral value corresponding to the wavelength $\lambda$ of the spectrum of the reflection spectral dataset, $S(\lambda)$ represents a spectral value corresponding to the wavelength $\lambda$ in a spectrum of the environmental illuminant under which the reference color image was captured, $R(\lambda)$ represents the spectral value corresponding to the wavelength $\lambda$ of the spectrum of the reflection spectral dataset of the reference object, and $\bar{x}$, $\bar{y}$ and $\bar{z}$ and represent color matching functions of the CIE 1931 XYZ color space.

It is noted that the converting operation as described above is performed in a pixel-to-pixel basis.

In step 22, the processor 12 obtains a parameter matrix from the converted reference image that is obtained in step 21.

Specifically, the parameter matrix is used to correct errors attributed to a number of factors that are associated with the camera used to capture the reference color image. In this embodiment, the factors involved include a non-linear response of the camera, a dark current associated with the camera, a deviation of a color filter of the camera, and a color shift of the camera (e.g., white balance (WB)). One or more matrices may be used to express correction parameters for correcting one or more of the above mentioned factors. Afterward, the parameter matrix may be obtained based on the one or more matrices for the above mentioned factors.

In this embodiment, a first matrix for the non-linear response of the camera may be expressed as $$V_{Non\text{-}linear} = [X_C^3\ Y_C^3\ Z_C^3\ X_C^2\ Y_C^2\ Z_C^2\ X_C\ Y_C\ Z_C\ 1]^T.$$

A second matrix for the dark current associated with the camera may be expressed as $V_{Dark} = [a]$, where a is a constant indicating the dark current, which is typically constant.

A third matrix for the deviation of the color filter of the camera and the color shift of the camera may be expressed as $$V_{Color} = [X_C Y_C Z_C\ X_C Y_C\ X_C Z_C\ Y_C Z_C\ X_C\ Y_C\ Z_C]^T,$$

where, since the reference color image has been converted to the CIE 1931 XYZ color space, the X, Y and Z values $X_C$, $Y_C$ and $Z_C$ of the pixel of the converted reference image are considered.

Using the above first to third matrixes, the parameter matrix is represented by:

$$V = [X_C^3\ Y_C^3\ Z_C^3\ X_C^2 Y_C\ X_C^2 Z_C\ Y_C^2 Z_C\ X_C Y_C^2\ X_C Z_C^2\ Y_C Z_C^2\ X_C Y_C Z_C\ X_C^2\ Y_C^2\ Z_C^2\ X_C Y_C\ X_C Z_C\ Y_C Z_C\ X_C\ Y_C\ Z_C\ \alpha]^T.$$

In step 23, the processor 12 obtains an adjustment matrix based on the converted spectral dataset and the parameter matrix. Specifically, the adjustment matrix [C] is obtained by performing multiple regression analysis based on the following equation:

$$C = [XYZ_{Spectrum}] \times \text{pinv}([V])$$

where [$XYZ_{spectrum}$] is a matrix containing the X, Y and Z values of the converted spectral dataset in the CIE 1931 XYZ color space, [V] is the parameter matrix, and pinv([V]) represents an inverse matrix of the parameter matrix.

In step 24, the processor 12 obtains a corrected image based on the parameter matrix and the adjustment matrix. Specifically, the processor 12 obtains the corrected image using the following equation:

$$[XYZ_{Correct}] = [C] \times [V]$$

where [$XYZ_{Correct}$] is a matrix containing X values, Y values and Z values of all pixels of the corrected image in the CIE 1931 XYZ color space. Using the above operation, the pixel values of the pixels that constitute the corrected image may be obtained, and the processor 12 is programmed to generate the corrected image accordingly.

Figure 3:
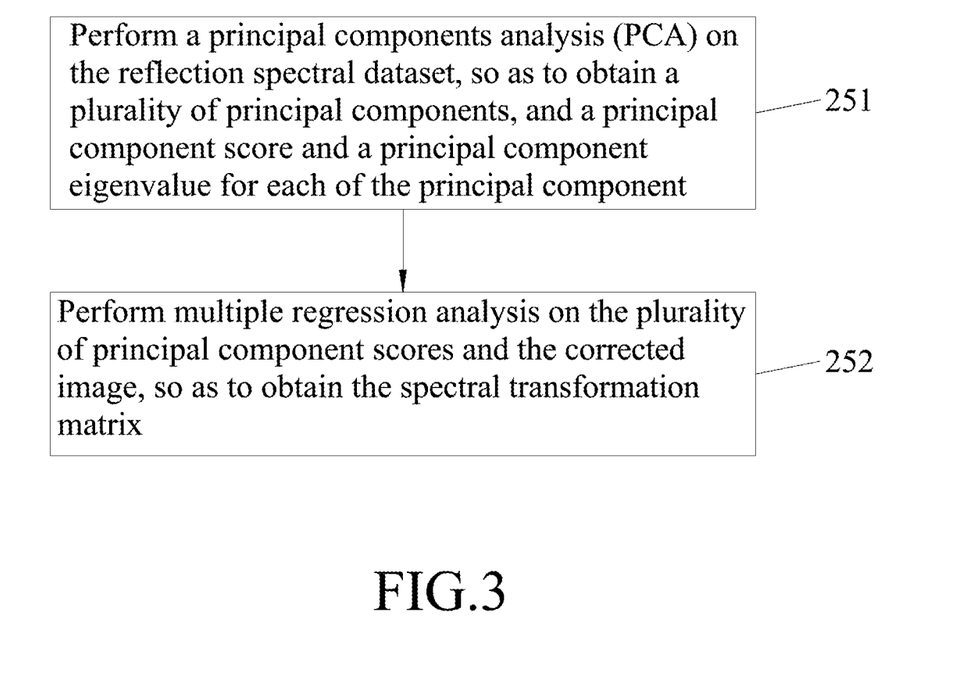
FIG. 3 is a flow chart illustrating sub-steps of operations for obtaining a spectral transformation matrix according to one embodiment of the disclosure.

In step 25, the processor 12 obtains a spectral transformation matrix from the reflection spectral dataset and the corrected image. Specifically, FIG. 3 is a flow chart illustrating sub-steps of operations in step 25 according to one embodiment of the disclosure.

In sub-step 251, the processor 12 performs a principal components analysis (PCA) on the reflection spectral dataset, so as to obtain a plurality of principal components, and a principal component score and a principal component eigenvalue for each of the principal components. In this embodiment, twelve principal component scores and twelve principal component eigenvalues of twelve principal components are obtained, as these principal component scores and principal component eigenvalues are capable of explaining 99.9964854% of variance within the reflection spectral dataset, but other numbers of principal component scores and principal component eigenvalues may be employed in other embodiments.

In sub-step 252, the processor 12 performs multiple regression analysis on the plurality of principal component scores and the corrected image, so as to obtain the spectral transformation matrix.

Specifically, the operation of sub-step 252 includes using the following equation to obtain the spectral transformation matrix M:

$$M = [\text{Score}] \times \text{pinv}([V_{Color}'])$$

where [Score] is a matrix that contains the plurality of principal component scores, $[V_{Color}'] = [X_C' Y_C' Z_C'\ X_C' Y_C'\ X_C' Z_C'\ Y_C' Z_C'\ X_C'\ Y_C'\ Z_C']^T$, and $X'_C$, $Y'_C$ and $Z'_C$ represent an X value, a Y value and a Z value of each pixel of the corrected image in the CIE 1931 XYZ color space.

With the spectral transformation matrix, it is then possible to construct a neural network model for performing the estimation of the severity of air pollution of the environment under test.

Figure 4:
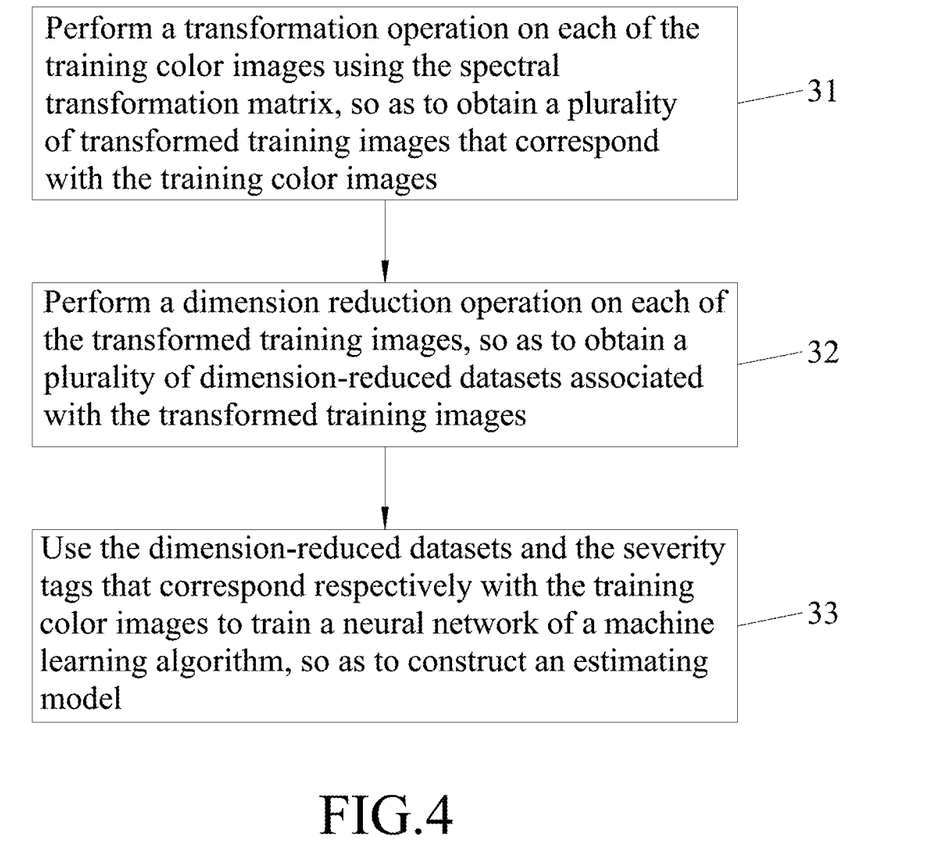
FIG. 4 is a flow chart illustrating steps of a model constructing process according to one embodiment of the disclosure.

FIG. 4 is a flow chart illustrating steps of the model constructing process according to one embodiment of the disclosure. In this embodiment, the model constructing process is implemented using the processor 12 executing the software application program.

In step 31, the processor 12 performs a transformation operation on each of the training color images using the spectral transformation matrix, so as to obtain a plurality of transformed training images that correspond with the training color images, respectively. The training color images may be pre-stored in the data storage 11, or may be obtained from an external source via the communication unit 13.

In step 32, the processor 12 performs a dimension reduction operation on each of the transformed training images, so as to obtain a plurality of dimension-reduced datasets associated with the transformed training images, respectively. In this embodiment, the dimension reduction operation may be done using a three-dimensional (3D) convolutional autoencoder or the PCA, but is not limited as such.

In step 33, the processor 12 uses the dimension-reduced datasets and the severity tags that correspond respectively with the training color images to train a neural network of a machine learning algorithm, so as to construct an estimating model for performing the air pollution estimation of the environment under test. Specifically, to train the neural network, the dimension-reduced datasets serve as inputs to the neural network, and the severity tags serve as known outputs of the neural network. That is to say, for each of the training color images of the specific environment, a concentration of fine aerosol particles of the specific environment is known (e.g., from official data of air quality monitoring), and therefore a type of the severity tag corresponding to the training color image is known and will be supplied to the neural network of the machine learning algorithm, for the neural network to "learn" about a relationship between the dimension-reduced datasets associated with the training color images and the associated severity of air pollution.

In this embodiment, the neural network of the machine learning algorithm may be a convolutional neural network (CNN) with a VGG16 (also known as OxfordNet) architecture. After a number of training operations, the estimating model can be used for performing air pollution estimation on the environment under test using an image of the environment under test. It should be noted that, in the case that the machine learning algorithm is with the VGG16 architecture, each of the training color images may be adjusted to a size of 224×224 pixels to fit a size of the first layer of the VGG16 architecture.

Figure 5:
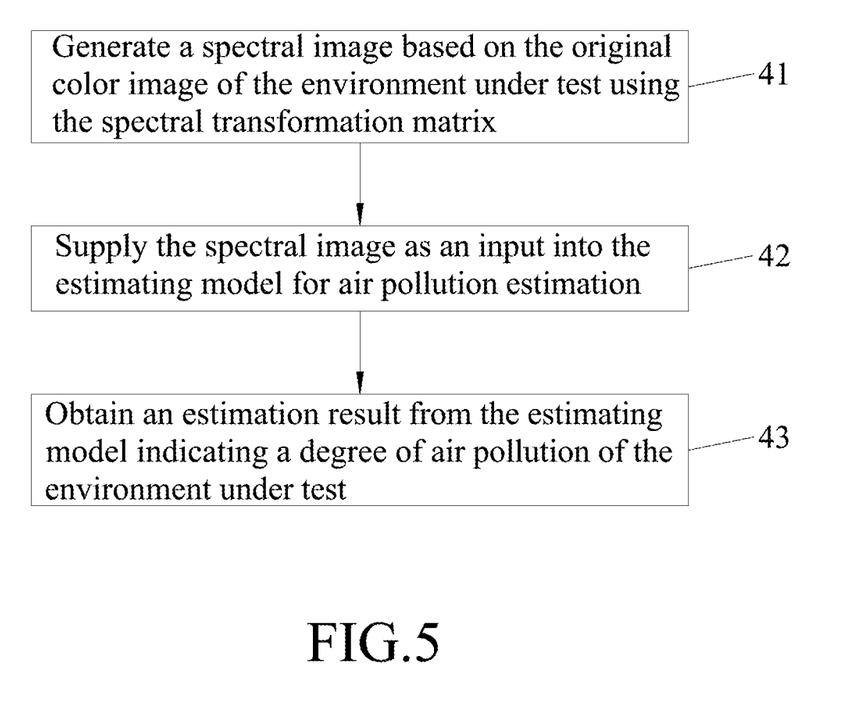
FIG. 5 is a flow chart illustrating steps of an air pollution estimating process according to one embodiment of the disclosure.

FIG. 5 is a flow chart illustrating steps of the air pollution estimating process according to one embodiment of the disclosure. The air pollution estimating process may be implemented by the processor 12 executing the software application program.

Figure 6:
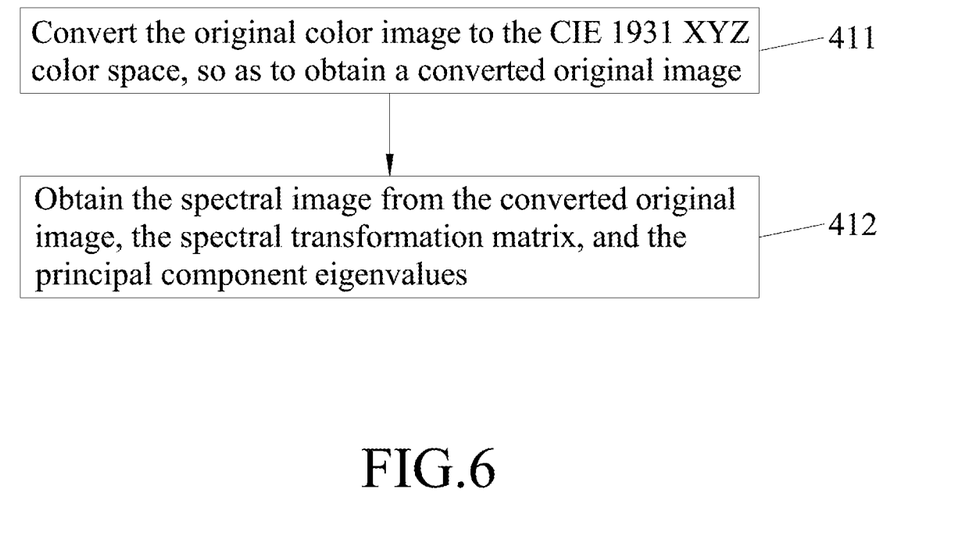
FIG. 6 is a flow chart illustrating sub-steps of operations of generating a spectral image according to one embodiment of the disclosure.

In step 41, the processor 12 generates a spectral image based on the original color image of the environment under test using the spectral transformation matrix. Specifically, FIG. 6 is a flow chart illustrating sub-steps of operations in step 41 according to one embodiment of the disclosure. The original color image may be pre-stored in the data storage 11, and is obtained in the same way as the training color images.

In sub-step 411, the processor 12 converts the original color image to the CIE 1931 XYZ color space, so as to obtain a converted original image. The operations of sub-step 411 may be done in a manner similar to that of step 21, and details thereof are omitted herein for the sake of brevity.

In sub-step 412, the processor 12 obtains the spectral image using the following equation:

$$[S_{Spectrum}] = [EV][M][V_{Color}'']$$

where $[S_{Spectrum}]$ is a matrix containing an X value, a Y value and a Z value of each of the pixels of the spectral image in the CIE 1931 XYZ color space, $[M]$ is the spectral transformation matrix, $[EV]$ represents the principal component eigenvalues, and $$[V_{Color}''] = [X_T Y_T Z_T\, X_T Y_T\, X_T Z_T\, Y_T Z_T\, X_T\, Y_T\, Z_T]^T$$

where $X_T$, $Y_T$ and $Z_T$ represent an X value, a Y value and a Z value of each pixel of the converted original image in the CIE 1931 XYZ color space, respectively.

It is noted that, the operation of step 41 may be done in a manner similar to that of step 31, and details thereof are omitted herein for the sake of brevity. After step 41, the spectral image that corresponds with the original image and that is in the CIE 1931 XYZ color space is generated.

In step 42, the processor 12 supplies the spectral image as an input into the estimating model for air pollution estimation.

In step 43, the processor 12 obtains an estimation result from the estimating model indicating a degree of air pollution of the environment under test. Specifically, the estimating model may detect the colors of the spectral image, so as to assign to the spectral image a severity tag selected from the three types of tags. As such, the assigned severity tag is outputted by the estimating model for notifying a user of an estimated air pollution severity of the environment under test. For example, a color associated with the type of the assigned severity tag may be displayed on a display screen (not shown).

To sum up, embodiments of the disclosure provide a method for air pollution estimation based on spectral image processing. In the method, a matrix calculating process is implemented to extract the accurate spectral information (e.g., the principle component scores, the principle component eigenvalues, etc.) from the reference object in the CIE 1931 XYZ color space. Also, various parameters that may cause errors in subsequent estimations are also adjusted in the spectral transformation matrix.

Then, using the spectral transformation matrix, the training color images may be transformed before being used to train the neural network of machine learning to construct the estimating model for actually performing the air pollution estimation.

Afterward, the air pollution estimating process is performed by first transforming the original color image of the environment under test to the spectral image using the spectral transformation matrix, and then supplying the spectral image to the estimating model, so as to obtain the estimation result from the estimating model where the estimation result indicates a degree of air pollution of the environment under test. As such, using an image of a specific environment, the air pollution estimation process of this disclosure may be performed with more accuracy than the prior art.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method of performing air pollution estimation, the method being implemented using a processor of a computer device, the computer device storing a reference color image of a reference object and a reflection spectral dataset associated with the reference object, the method comprising:
   A) generating a spectral image based on an original color image of an environment under test using a spectral transformation matrix;
   B) supplying the spectral image as an input into an estimating model for air pollution estimation; and
   C) from the estimating model, obtaining an estimation result indicating a degree of air pollution of the environment under test;
   the method further comprising, prior to step A):
   D) performing a converting operation to convert the reference color image and the reflection spectral dataset to a CIE 1931 XYZ color space created by the International Commission on Illumination (CIE) in 1931, so as to obtain a converted reference image and a converted spectral dataset corresponding to the reference color image and the reflection spectral dataset, respectively;
   E) obtaining a parameter matrix from the converted reference image;
   F) obtaining an adjustment matrix from the converted spectral dataset and the parameter matrix;
   G) obtaining a corrected image based on the parameter matrix and the adjustment matrix; and
   H) obtaining the spectral transformation matrix from the reflection spectral dataset and the corrected image.

2. The method of claim 1, the reference color image being in the form of an 8-bit color image expressed using a standard red, green, blue (sRGB) color space, wherein in step D), the converting operation includes:
   obtaining the converted reference image using the equations:

$$\begin{bmatrix} X_C \\ Y_C \\ Z_C \end{bmatrix} = [M_A][T] \begin{bmatrix} f(R_{sRGB}) \\ f(G_{sRGB}) \\ f(B_{sRGB}) \end{bmatrix} \times 100, \quad 0 \le \begin{matrix} R_{sRGB} \\ G_{sRGB} \\ B_{sRGB} \end{matrix} \le 1;$$

$$T = \begin{bmatrix} 0.4104 & 0.3576 & 0.1805 \\ 0.2126 & 0.7152 & 0.0722 \\ 0.0193 & 0.1192 & 0.9505 \end{bmatrix};$$

$$f(n) = \begin{cases} \left(\dfrac{n+0.055}{1.055}\right)^{2.4}, & n > 0.04045 \\ \left(\dfrac{n}{12.92}\right), & \text{otherwise} \end{cases};$$

and $$[M_A] = \begin{bmatrix} X_{SW}/X_{CW} & 0 & 0 \\ 0 & Y_{SW}/Y_{CW} & 0 \\ 0 & 0 & Z_{SW}/Z_{CW} \end{bmatrix},$$

where $X_C$, $Y_C$ and $Z_C$ represent an X value, a Y value and a Z value of a pixel of the converted reference image in the CIE 1931 XYZ color space, $R_{sRGB}$, $G_{sRGB}$ and $B_{sRGB}$ represent a red value, a green value and a blue value of a pixel of the reference color image in the sRGB color space corresponding to the pixel of the converted reference image, $X_{CW}$, $Y_{CW}$ and $Z_{CW}$ represent a white point defining the white color in the sRGB color space, $X_{SW}$, $Y_{SW}$ and $Z_{SW}$ represent a white point for an environmental illuminant under which the reference color image was captured, and $[M_A]$ represents a chromatic adaptation matrix; and
obtaining the converted spectral dataset using the equations:

$$X_S = k\int_{380nm}^{780nm} S(\lambda)R(\lambda)\bar{x}(\lambda)d\lambda;$$

$$Y_S = k\int_{380nm}^{780nm} S(\lambda)R(\lambda)\bar{y}(\lambda)d\lambda;$$

$$Z_S = k\int_{380nm}^{780nm} S(\lambda)R(\lambda)\bar{z}(\lambda)d\lambda; \text{ and}$$

$$k = 100/\int_{380nm}^{780nm} S(\lambda)\bar{y}(\lambda)d\lambda,$$

where, for each wavelength $\lambda$ of the spectrum of the reflection spectral dataset, $X_S$, $Y_S$ and $Z_S$ represent an X value, a Y value and a Z value of the converted spectral dataset in the CIE 1931 XYZ color space for the spectral value corresponding to the wavelength $\lambda$ of the spectrum of the reflection spectral dataset, $S(\lambda)$ represents a spectral value corresponding to the wavelength $\lambda$ in a spectrum of the environmental illuminant under which the reference color image was captured, $R(\lambda)$ represents the spectral value corresponding to the wavelength $\lambda$ of the spectrum of the reflection spectral dataset of the reference object, and $\bar{x}$, $\bar{y}$ and $\bar{z}$ represent color matching functions of the CIE 1931 XYZ color space.

3. The method of claim 1, wherein in step E), the parameter matrix is represented by:

$$V = [X_C^3 \; Y_C^3 \; Z_C^3 \; X_C^2 Y_C \; X_C^2 Z_C \; Y_C^2 Z_C \; X_C Y_C^2 \; X_C Z_C^2 \\ Y_C Z_C^2 \; X_C Y_C Z_C \; X_C^2 \; Y_C^2 \; Z_C^2 \; X_C Y_C \; X_C Z_C \; Y_C Z_C \\ X_C \; Y_C \; Z_C \; \alpha]^T$$

where $X_C$, $Y_C$ and $Z_C$ represent an X value, a Y value and a Z value of a pixel of the converted reference image in the CIE 1931 XYZ color space, and $\alpha$ is a constant indicating a dark current.

4. The method of claim 1, wherein in step F), the adjustment matrix is represented by:

$$[C] = [XYZ_{Spectrum}] \times \text{pinv}([V])$$

where $[XYZ_{Spectrum}]$ is a matrix containing the X, Y and Z values the converted spectral dataset in the CIE 1931 XYZ color space, [V] is the parameter matrix, and pinv([V]) represents an inverse matrix of the parameter matrix.

5. The method of claim 1, wherein in step G), the processor obtains the corrected image using the following equation:

$$[XYZ_{Correct}] = [C] \times [V]$$

where $[XYZ_{Correct}]$ is a matrix containing X values, Y values and Z values of all pixels of the corrected image in the CIE 1931 XYZ color space, [C] represents the adjustment matrix, and [V] represents the parameter matrix.

6. The method of claim 1, wherein step H) includes:

H-1) performing a principal components analysis (PCA) on the reflectance spectral dataset, so as to obtain a plurality of principal component scores; and H-2) performing a multiple regression analysis on the plurality of principal component scores and the corrected image, so as to obtain the spectral transformation matrix.

7. The method of claim 6, wherein sub-step H-2) includes using the following equation to obtain the spectral transformation matrix:

$$M = [\text{Score}] \times \text{pinv}([V_{Color}'])$$

where [Score] represents a matrix that contains the plurality of principal component scores, $[V_{Color}'] = [X_C' Y_C' Z_C' X_C' Y_C' X_C' Z_C' Y_C' Z_C' X_C' Y_C' Z_C']^T$, and X'c, Y'c and Z'c represent an X value, a Y value and a Z value of a pixel of the corrected image in the CIE 1931XYZ space.

8. The method of claim 6, wherein sub-step H-1) further includes obtaining a plurality of eigenvalues, and step A) includes:

A-1) performing a converting operation to convert the original color image to a CIE 1931 XYZ space, so as to obtain a converted original image;

A-2) obtaining the spectral image using the following equation:

$$[S_{Spectrum}] = [EV][M][V_{Color}'']$$

where $[S_{Spectrum}]$ is a matrix containing an X value, a Y value and a Z value of each of the pixels of the spectral image in the CIE 1931 XYZ color space, [M] is the spectral transformation matrix, [EV] represents the principal component eigenvalues, and $$[V_{Color}''] = [X_T Y_T Z_T X_T Y_T X_T Z_T Y_T Z_T X_T Y_T Z_T]^T$$

where $X_T$, $Y_T$ and $Z_T$ represent an X value, a Y value and a Z value of each pixel of the converted original image in the CIE 1931 XYZ color space, respectively.

9. The method of claim 1, further comprising, prior to step B), steps of:

I) in response to receipt of a plurality of training color images, performing a transformation operation on the training color images using the spectral transformation matrix so as to obtain a plurality of transformed training images;

J) performing a dimension reduction operation on the transformed training images, so as to obtain a plurality of dimension-reduced datasets associated with the transformed training images, respectively; and K) supplying the dimension-reduced datasets and a plurality of severity tags that correspond with the training color images, respectively, and that indicate various degrees of air pollution as inputs to a machine learning algorithm to perform a training operation, so as to construct the estimating model.

10. A method for obtaining a spectral transformation matrix to be used in performing air pollution estimation, the method being implemented using a processor of a computer device, the computer device storing a reference color image of a reference object and a reflection spectral dataset associated with the reference object, the method comprising:

performing a converting operation to convert the reference color image and the reflection spectral dataset to a CIE 1931 XYZ color space created by the International Commission on Illumination (CIE) in 1931, so as to obtain a converted reference image and a converted spectral dataset corresponding to the reference color image and the reflection spectral dataset, respectively;

obtaining a parameter matrix from the converted reference image;

obtaining an adjustment matrix from the converted spectral dataset and the parameter matrix;

obtaining a corrected image based on the parameter matrix and the adjustment matrix; and obtaining the spectral transformation matrix from the reflection spectral dataset and the corrected image.

11. The method of claim 10, the reference color image being in the form of an 8-bit color image expressed using a standard red, green, blue (sRGB) color space, wherein the converting operation includes:

obtaining the converted reference image using the equations:

$$\begin{bmatrix} X_C \\ Y_C \\ Z_C \end{bmatrix} = [M_A][T] \begin{bmatrix} f(R_{sRGB}) \\ f(G_{sRGB}) \\ f(B_{sRGB}) \end{bmatrix} \times 100, \ 0 \le \begin{matrix} R_{sRGB} \\ G_{sRGB} \\ B_{sRGB} \end{matrix} \le 1;$$

$$T = \begin{bmatrix} 0.4104 & 0.3576 & 0.1805 \\ 0.2126 & 0.7152 & 0.0722 \\ 0.0193 & 0.1192 & 0.9505 \end{bmatrix};$$

$$f(n) = \begin{cases} \left(\dfrac{n+0.055}{1.055}\right)^{2.4}, & n > 0.04045 \\ \left(\dfrac{n}{12.92}\right), & \text{otherwise} \end{cases};$$

and $$[M_A] = \begin{bmatrix} X_{SW}/X_{CW} & 0 & 0 \\ 0 & Y_{SW}/Y_{CW} & 0 \\ 0 & 0 & Z_{SW}/Z_{CW} \end{bmatrix},$$

where $X_C$, $Y_C$ and $Z_C$ represent an X value, a Y value and a Z value of a pixel of the converted reference image in the CIE 1931 XYZ color space, $R_{sRGB}$, $G_{sRGB}$ and $B_{sRGB}$ represent a red value, a green value and a blue value of a pixel of the reference color image in the sRGB color space corresponding to the pixel of the converted reference image, $X_{CW}$, $Y_{CW}$ and $Z_{CW}$ represent a white point defining the white color in the sRGB color space, $X_{SW}$, $Y_{SW}$ and $Z_{SW}$ represent a white point for an environmental illuminant under which the reference color image was captured, and $[M_A]$ represents a chromatic adaptation matrix; and obtaining the converted spectral dataset using the equations:

$$X_S = k \int_{380nm}^{780nm} S(\lambda) R(\lambda) \bar{x}(\lambda) d\lambda;$$

$$Y_S = k \int_{380nm}^{780nm} S(\lambda) R(\lambda) \bar{y}(\lambda) d\lambda;$$

$$Z_S = k \int_{380nm}^{780nm} S(\lambda) R(\lambda) \bar{z}(\lambda) d\lambda; \text{ and}$$

$$k = 100 / \int_{380nm}^{780nm} S(\lambda) \bar{y}(\lambda) d\lambda,$$

where, for each wavelength $\lambda$ of the spectrum of the reflection spectral dataset, $X_S$, $Y_S$ and $Z_S$ represent an X value, a Y value and a Z value of the converted spectral dataset in the CIE 1931 XYZ color space for the spectral value corresponding to the wavelength $\lambda$ of the spectrum of the reflection spectral dataset, $S(\lambda)$ represents a spectral value corresponding to the wavelength $\lambda$ in a spectrum of the environmental illuminant under which the reference color image was captured, $R(\lambda)$ represents the spectral value corresponding to the wavelength $\lambda$ of the spectrum of the reflection spectral dataset of the reference object, and $\bar{x}$, $\bar{y}$ and $\bar{z}$ represent color matching functions of the CIE 1931 XYZ color space.

12. The method of claim 10, wherein the parameter matrix is represented by:

$$V=[X_C^3\ Y_C^3\ Z_C^3\ X_C^2Y_C\ X_C^2Z_C\ Y_C^2Z_C\ X_CY_C^2\ X_CZ_C^2\ Y_CZ_C^2\ X_CY_CZ_C\ X_C^2\ Y_C^2\ Z_C^2\ X_CY_C\ X_CZ_C\ Y_CZ_C\ X_C\ Y_C\ Z_C\ \alpha]^T$$

where $X_C$, $Y_C$ and $Z_C$ represent an X value, a Y value and a Z value of a pixel of the converted reference image in the CIE 1931 XYZ color space, and $\alpha$ is a constant indicating a dark current.

13. The method of claim 10, wherein the adjustment matrix is represented by:

$$[C]=[XYZ_{Spectrum}]\times\text{pinv}([V])$$

where $[XYZ_{Spectrum}]$ is a matrix containing the X, Y and Z values the converted spectral dataset in the CIE 1931 XYZ color space, [V] is the parameter matrix, and pinv([V]) represents an inverse matrix of the parameter matrix.

14. The method of claim 10, wherein the corrected image is obtained using the following equation:

$$[XYZ_{Correct}]=[C]\times[V]$$

where $[XYZ_{Correct}]$ is a matrix containing X values, Y values and Z values of all pixels of the corrected image in the CIE 1931 XYZ color space, [C] represents the adjustment matrix, and [V] represents the parameter matrix.

15. The method of claim 10, wherein the obtaining of the spectral transformation matrix includes:

performing a principal components analysis (PCA) on the reflectance spectral dataset, so as to obtain a plurality of principal component scores; and performing a multiple regression analysis on the plurality of principal component scores and the corrected image, so as to obtain the spectral transformation matrix.

16. The method of claim 15, wherein the following equation is used to obtain the spectral transformation matrix:

$$M=[Score]\times\text{pinv}([V_{Color}'])$$

where [Score] represents a matrix that contains the plurality of principal component scores, $[V_{Color}']=[X_C'Y_C'Z_C'\ X_C'Y_C'\ X_C'Z_C'\ Y_C'Z_C'\ X_C'\ Y_C'\ Z_C']^T$, and X'c, Y'c and Z'c represent an X value, a Y value and a Z value of a pixel of the corrected image in the CIE 1931XYZ space.

17. The method of claim 10, wherein, the PCA further includes obtaining a plurality of eigenvalues, and the generating of the spectral image includes:

performing a converting operation to convert the original color image to a CIE 1931 XYZ space, so as to obtain a converted original image;

obtaining the spectral image using the following equation:

$$[S_{Spectrum}]=[EV][M][V_{Color}'']$$

where $[S_{Spectrum}]$ is a matrix containing an X value, a Y value and a Z value of each of the pixels of the spectral image in the CIE 1931 XYZ color space, M is the spectral transformation matrix, [EV] represents the principal component eigenvalues, and $$[V_{Color}'']=[X_TY_TZ_T\ X_TY_T\ X_TZ_T\ Y_TZ_T\ X_T\ Y_T\ Z_T]^T$$

where $X_T$, $Y_T$ and $Z_T$ represent an X value, a Y value and a Z value of each pixel of the converted original image in the CIE 1931 XYZ color space, respectively.

* * * * *